United States Patent [19]

Oesterle

[11] 4,227,825
[45] Oct. 14, 1980

[54] RELEASE DEVICE FOR THE AUTOMATIC RAPID BRAKING OF MOVING MACHINE PARTS, PARTICULARLY OF LOOMS

[75] Inventor: Gerhard Oesterle, Staad, Switzerland
[73] Assignee: Adolph Saurer Limited, Arbon, Switzerland
[21] Appl. No.: 966,487
[22] Filed: Dec. 4, 1978
[30] Foreign Application Priority Data
Dec. 6, 1977 [CH] Switzerland ............ 014940/77
[51] Int. Cl.² ................................ F16D 1/00
[52] U.S. Cl. ........................... 403/322; 188/171
[58] Field of Search ............ 139/1 E; 188/171; 403/322, 327, 330; 285/317, 320

[56] References Cited
U.S. PATENT DOCUMENTS

| | | | |
|---|---|---|---|
| 1,902,640 | 3/1933 | Halfvarson | 188/171 |
| 2,107,894 | 2/1938 | Hymans | 188/171 |
| 2,732,041 | 1/1956 | Anderson | 188/171 |
| 2,792,080 | 5/1957 | Dunlop | 188/171 |
| 2,794,633 | 6/1957 | Delang | 403/330 |

FOREIGN PATENT DOCUMENTS 478420 11/1951 Canada ............................. 403/330

*Primary Examiner*—Henry Jaudon
*Attorney, Agent, or Firm*—Bailey, Dority & Flint

[57] ABSTRACT

The invention relates to a release device for effecting the automatic rapid braking of moving machine parts, particularly of looms, which includes a braking actuating linkage subject to the action of force in the direction of actuation and maintained locked when the brake is released during machine running operation, and an electromagnet for unlocking the braking actuating linkage, energization of which is controlled by signals from monitoring members produced in case of breakdowns.

2 Claims, 3 Drawing Figures

RELEASE DEVICE FOR THE AUTOMATIC RAPID BRAKING OF MOVING MACHINE PARTS, PARTICULARLY OF LOOMS

BACKGROUND OF THE INVENTION

Rapidly operating machines must often be stopped in a short time on special occasions, such as breakdowns or interruptions in the working process. This is necessary for instance in looms, when irregularities such as a thread breakage or untimely flight of the shuttle occur during the weaving process, so that no greater damage occurs to the material being woven, for example, but the shuttle being struck in the shed. This requires very efficient brakes and release devices for the braking process, which respond with as little delay as possible to the interference signals transmitted by monitoring members. Transmission of the interference signals from the monitoring members to the release device usually takes place electrically, wherein release is provided by an electromagnet unlocking an actuating linkage for a braking member (brake shoe, brake band or the like), which is normally held under the action of force by a lock and when the brake is released, is held by the magnetic core moved by the magnetic force.

A device of this type is known in which the actuating linkage of the brake comprises a sleeve and a rod which fits in the latter axially displaceably, wherein one of these parts is rigidly connected to the machine frame and the other to the braking member. When the brake is released, the parts are telescoped together against spring tension and held in this position by a bolt passed through perpendicularly. For unlocking, the bolt is withdrawn from the locking position by means of an electromagnet and braking is initiated by the spring tension which biasses sleeve and rod apart.

This arrangement has the disadvantage that, on withdrawal of the locking bolt, considerable friction forces and in addition a considerable distance corresponding to the sleeve diameter must be overcome, which delays release.

It is the object of the invention to create a release device of the kind mentioned above in which release is accelerated.

SUMMARY OF THE INVENTION

It has been found that an accelerated release of the braking actuating linkage can be provided according to the invention wherein an electromagnet is fixed with its movable magnetic core at least approximately coaxially with the braking actuating linkage in a stator housing which is open in the direction of braking actuation and which comprises an inwardly extending projection in the region of its opening. The braking actuating linkage comprises at least one angle lever pivotable in an axial or approximately axial plane, with a locking arm extending essentially in the direction of movement of the braking actuating linkage and ending in a hook in the region of the opening of the stator housing wherein the hook can engage behind the projection for locking, and an actuating arm which is essentially perpendicular thereto and which extends into the path of movement of the magnetic core.

In the release device according to the invention, both friction and unnecessarily long actuating distances are avoided during unlocking. This speeds up the release process and hence application of the brake. On account of the arrangement according to the invention, the magnetic force used for release acts in the direction of the braking actuating force and thereby further increases acceleration or shortens the release time in addition.

For the purpose of better utilizing the magnetic force to accelerate the braking actuating linkage after unlocking has taken place, the movement of the angle lever is limited by a stop on the braking actuating linkage, wherein the hook on the locking arm of the angle lever is clear of the angular projection in the stop position.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
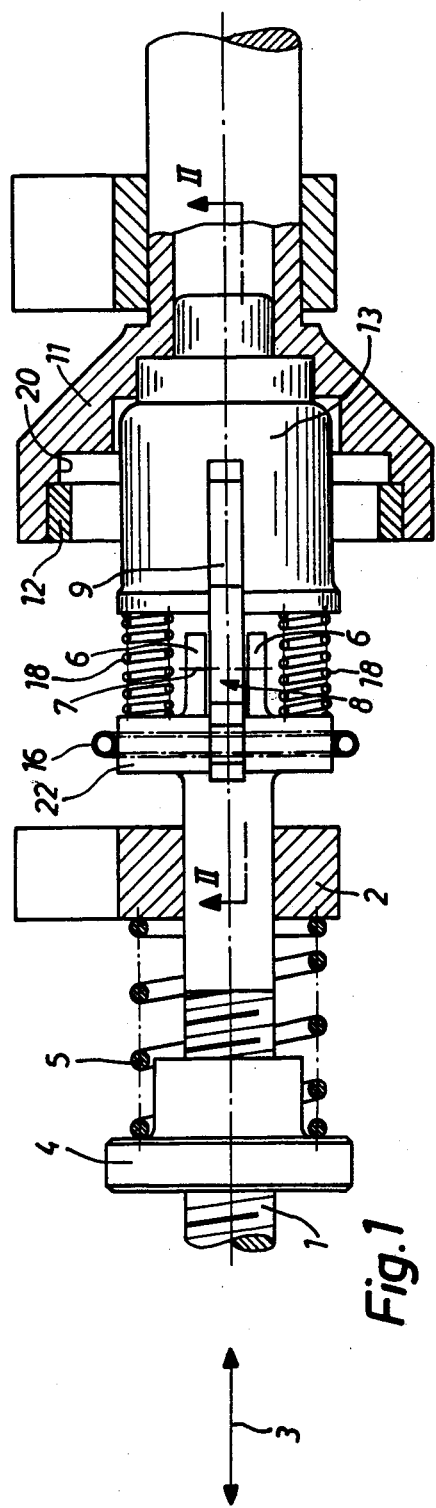
FIG. 1 shows a partially sectioned side view of a release device according to the invention.

A braking actuating linkage marked with the reference number 1 is movable in a guide 2 in the direction of the double arrow 3 to apply and release the braking members of a brake (not shown). A braking spring, which is supported on the stationary guide 2 and which acts to the left, as seen in the drawings, on a collar 4 of the braking actuating linkage 1, in the form of a helical compression spring 5, produces the braking force required to stop the machine. At its free end, the braking actuating linkage 1 has a flange 22 which includes a stop surface 23 with two pairs of wing lugs 6 each for supporting a bolt 7 which act as a pivot axis for two angle levers 8. A locking arm 9 of each angle lever 8 extends essentially in the direction of the double arrow 3 and comprises a hook 19 at its end. An actuating arm 10 which is essentially perpendicular to locking arm 9 extends approximately to the center axis of the braking actuating linkage 1. The angle lever further has a counterarm 15 extending in the same way as the locking arm 9 with a groove 17 in which is inserted a tube spring 16 which biasses the locking arms 9 of the angle levers 8 apart.

In extension of the braking actuating linkage and at least approximately coaxially therewith is arranged a stator housing 11 which opens in a bell shape towards the braking actuating linkage. The stator housing 11 comprises at its open end a radially inwardly extending annular projection 12 behind which is formed an annular groove 20. Housing 11 includes a portion 11a held in a block 11b which is integrally a part of the machine. Mounted coaxially in the stator housing is an electromagnet 13 with a movable magnetic core 14. Portion 11a may be hollow to accommodate leads 13a which energize electromagnet 13 by a signal from a monitor member 14a which may be, for example, sensing warp thread breakage on the loom. Two compression springs 18, with high-angle characteristic and spring travel corresponding to the length of braking path of the braking actuating linkage 1, are fixed between the armature of the electromagnet and angle lever support.

Figure 2:
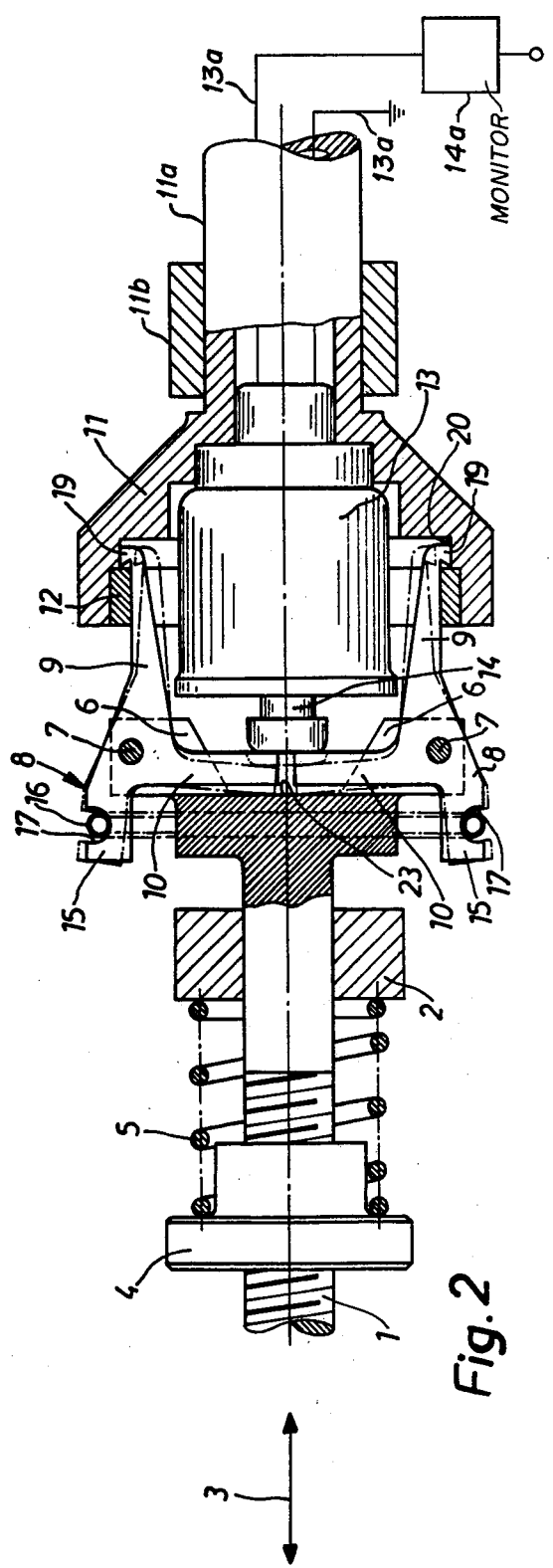
FIG. 2 shows a partial section along line II–II in FIg. 1.
Figure 3:
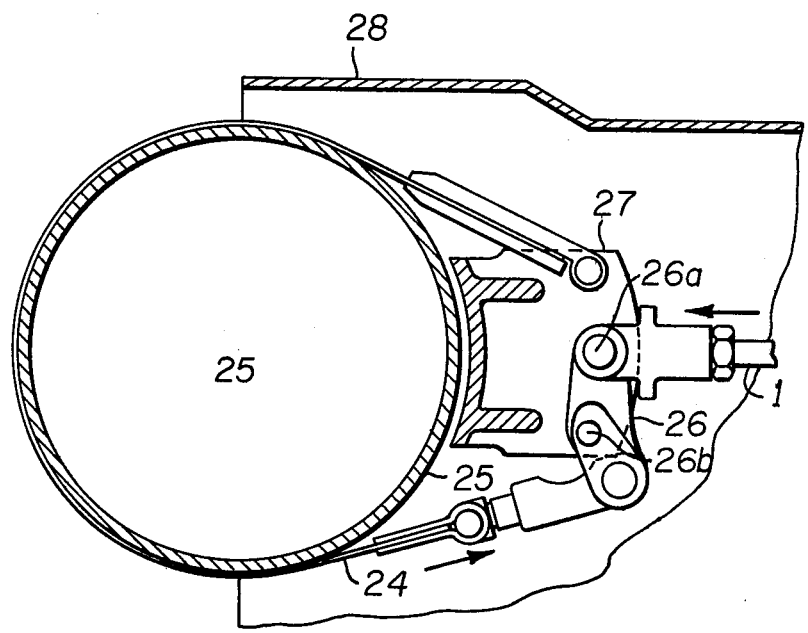
FIG. 3 shows a side elevation of braking of moving machine parts of a loom.

The device operates as follows:

FIGS. 1 and 2 show the device with the machine running and, therefore, the brake released and the braking actuating linkage 1 locked. If the electromagnet is now energized by a signal from a monitoring member via suitable control equipment, then the magnetic force bears via the magnetic core 14 on the actuating arm 10 of the angle lever, to the left as seen in the drawings, against a stop surface 23 on the flange 22 of the braking actuating linkage 1. As a result, the locking arm 9 is moved towards the center, so that the hooks 19 can come clear of the annular groove 20 behind the projection 12 and slide freely to the left under the influence of the braking spring 5; and, hence, the braking actuating linkage 1 is unlocked and the braking member 24 of the machine is applied to the moving part 25. As the actuating linkage 1 moves to the left, linkage 26 pivots about 26a and 26b, carried by stationary bracket 27 which may be affixed to the machine 28, engaging the braking band member 24 about the moving part 25 in the direction of the arrows as illustrated.

Under the influence of the residual magnetic force, applied via armature 14, angle levers 10, compression springs 18, and to a small extent also the braking spring 5, which has a low-angle characteristic with long spring travel in accordance with its function as braking force generator, the braking actuating linkage 1 is accelerated secondarily in the direction of braking actuation. To start the machine, the braking actuating linkage 1 is locked mechanically by manual movement of the braking linkage 1 in the axial direction 3, to the right wherein the hooks 19 on the arms 9 of the angle levers 8 may be manually engaged in the annular groove 20 in the stator housing 11. The springs 18 and the tube spring 16 are tensioned during this locking process.

Following the locking process, the brake can be eased and the coupling actuated.

While a preferred embodiment of the invention has been described using specific terms, such description is for illustrative purposes only, and it is to be understood that changes and variations may be made without departing from the spirit or scope of the following claims.

What is claimed is:

1. A release device for actuating the automatic rapid braking of moving machine parts, such as weaving looms of the type having a braking actuating linkage subject to the action of forces in the direction of actuation and maintained locked when the brake is released, and an electromagnet for unlocking the braking actuating linkage, energization of which is controlled by signals from monitoring members produced in case of breakdowns, said device comprising:

said electromagnet having a movable magnetic core carried generally coaxially with the direction of movement of the braking actuating linkage;

a stator housing which is open in the direction of braking actuation and which includes an inwardly extending projection in the region of its opening;

said braking actuating linkage including at least one angle lever pivotable in an axial plane;

a locking arm carried by said angle lever extending essentially in the direction of movement of the braking actuating linkage and terminating in a hook portion in the region of the opening of the stator housing;

said hook engaging behind said inwardly extending projection for locking; and an actuating arm carried by said angle lever generally perpendicular thereto which extends into the path of movement of said magnetic core.

2. A release device according to claim 1 including a stop for engaging said actuating arm of said angle lever when released wherein said hook portion of said locking arm is clear of said annular projection when said actuating arm is engaged against said stop.

* * * * *